United States Patent [19]

Okada et al.

[11] 4,363,961
[45] Dec. 14, 1982

[54] AUTOMATIC FOCUSING APPARATUS

[75] Inventors: Kazuo Okada; Mitsushige Kondo, both of Amagasaki, Japan

[73] Assignee: Mitsubishi Denki Kabushiki Kaisha, Tokyo, Japan

[21] Appl. No.: 154,399

[22] PCT Filed: Dec. 13, 1978

[86] PCT No.: PCT/JP78/00052

§ 371 Date: Aug. 16, 1979

§ 102(e) Date: Jun. 20, 1979

[87] PCT Pub. No.: WO79/00400

PCT Pub. Date: Jul. 12, 1979

[30] Foreign Application Priority Data

Dec. 16, 1977 [JP] Japan ............... 52-152086

[51] Int. Cl.³ .............................. G01J 1/20
[52] U.S. Cl. ...................... 250/201; 250/204
[58] Field of Search .......... 250/201, 204; 354/25; 356/4

[56] References Cited

U.S. PATENT DOCUMENTS 3,506,839 4/1970 Ando et al. ............... 20/222
3,812,477 5/1974 Weider ................ 340/173 LM
3,941,945 3/1976 Borner et al. .......... 179/100.41 L Primary Examiner—David C. Nelms
Assistant Examiner—Darwin R. Hostetter
Attorney, Agent, or Firm—Oblon, Fisher, Spivak, McClelland & Maier

[57] ABSTRACT

A automatic focusing apparatus is disclosed for automatically focusing a focal point on an object substrate wherein the pn junction of an emitting part of a semiconductor ray source itself, has the effect of a pin-hole in order to eliminate a complicated setting of a position of a pin-hole panel whereby variation of the output of the semiconductor ray source caused by reflective ray is detected by a phase detector and the output is applied to an actuator to carry out an automatic focusing.

5 Claims, 5 Drawing Figures

AUTOMATIC FOCUSING APPARATUS

FIELD OF THE INVENTION

The present invention relates to an automatic focusing apparatus which automatically focuses the focal point of a ray on an object substrate.

BACKGROUND OF THE INVENTION

FIG. 1 is a diagram showing a structure of one embodiment of the conventional automatic focusing apparatus.

In FIG. 1, the reference numeral (1) designates a laser source such as helium-neon laser source; (2) designates a laser ray flux; (3) designates objective lens; (4) designates an object substrate on which a focal point of the flux (2) is formed; (5) designates a beam splitter; (6) designates a condenser lens; (7) designates a pin-hole; (8) designates a ray detector; (9) designates a piezo-electric vibrator for vibrating the pin-hole (7) to the optical axial direction; (10) designates a table on which an optical system is placed; (11) designates an oscillator for exciting the vibrator (9); (12) designates a phase detector which phase-detects an output of the ray detector (8) under rating an output of the oscillator (11); and (13) designates a voice coil type actuator which drives the table (10) by the output of the phase detector (12).

In the apparatus, the laser ray (2) emitted from the laser source (1) is focused through the objective lens on the surface of the object substrate (4). The ray reflected from the surface of the object substrate (4) is focused again through the objective lens (3) thereby separating from the incident path by the beam splitter (5) and the ray is passed to the condenser lens (6) and focused to form ray spot and the ray is passed to the ray detector (8). The pin-hole having a diameter being substantially the same as the diameter of the ray spot is disposed at the focal point of the condenser lens (6) and the pin-hole is vibrated at frequency f by the vibrator (9) excited by the oscillator (11) in the optical axial direction. The output of the ray detector (8) which receives the ray passed through the pin-hole (7) is phase-detected by the phase detector (12) upon rating the output of the oscillator (11) and the detection output is fed to the actuator (13) to drive the table (10) to the arrow line direction A. That is, when the focal point of the objective lens (3) is on the surface of the object substrate (4), the focal point of the condenser lens (6) is at the vibration center of the pin-hole (7) whereby signal having frequency 2f is provided from the ray detector (8) and the output of the phase detector (12) is zero. However, when the surface of the object substrate (4) is deviated from the focal point of the objective lens (3), the position of the ray spot given by the condenser lens (6) is deviated from the vibration center of the pin-hole (7) whereby the component of frequency f is formed in the output of the ray detector (8). The phase corresponds to the direction deviating the surface of the object substrate (4) from the focal point of the objective lens (3). Accordingly, the focal point of the objective lens (3) is automatically focused on the surface of the object substrate (4) by driving the table (10) to the arrow line direction A through the actuator (13) by the output of the phase detector (12) in which the output of the ray detector (8) is phase-detected.

Thus, in the conventional apparatus, it is not always necessary to vibrate the pin-hole (7) itself and the objective lens (3) or the condenser lens (6) can be vibrated. However, it is necessary to form the pin-hole (7). It is not easy to set the pin-hole at the center of the ray spot because the diameter of the pin-hole is preferably about several tens microns. Moreover, the position of the pin-hole may be shifted by outer vibration during long time which causes an erroneous operation of the apparatus. This apparatus is especially not suitable for an apparatus which should be low cost and is used in variable environment such as a video disc regenerative apparatus.

SUMMARY OF THE INVENTION

The present invention is to provide an automatic focusing apparatus wherein a semiconductor ray source is used as a ray source and the ray emitted from the semiconductor ray source is focused on a surface of an object substrate and its reflective ray is focused to emitting part of the semiconductor ray source and an optical axial direction of the focused ray spot is vibrated at a predetermined number of vibration and the variation of the output characteristic of the semiconductor ray source induced by the reflected ray from the object substrate is detected whereby the focal point of the ray spot coincides with the surface of the object substrate depending upon the detection output.

In accordance with the present invention, the emitting part of the semiconductor ray source itself is the pin-hole whereby the deviation of the pin-hole in the conventional apparatus can be prevented and no erroneous operation is caused. Moreover, no pin-hole is formed whereby it is unnecessary to make effort for finely adjusting the position. Further more, the optical system of the present invention is a recurrence optical system wherein the ray emitted from the emitting part is always returned to the emitting part when the disc is placed at the focal point, whereby it is unnecessary to adjust the position of the ray source. Thus, the apparatus of the present invention has significant advantage in practical use as an automatic focusing apparatus for a video disc player.

DESCRIPTION OF THE PREFERRED EMBODIMENTS

Figure 1:
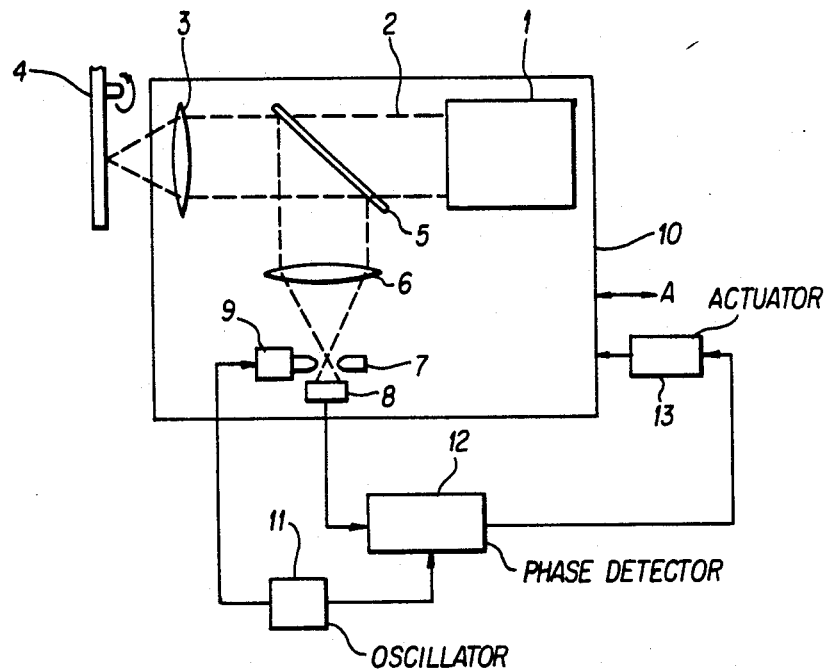
FIG. 1 is a diagram showing a structure of one embodiment of the conventional automatic focusing apparatus.
Figure 2:
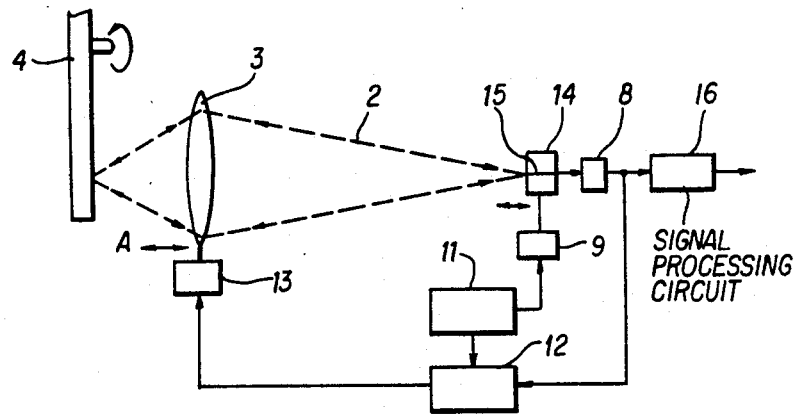
FIG. 2 is a diagram showing a structure of one embodiment of the present invention.

FIG. 2 is a diagram showing one embodiment of the present invention wherein the corresponding parts are designated by the same references.

In FIG. 2, the reference (14) designates a semiconductor ray source such as GaAs double hetero-structure semiconductor laser or light emission diode; (15) designates an emitting part having pn junction.

In this embodiment, a video disc in which video signal is optically recorded is used as the object substrate (4). The reference (16) designates a circuit for processing signal read-out from the video disc.

The ray (2) emitted from the semiconductor ray source (14) is focused through the objective lens as the focusing means on the surface of the video disc (4). The ray reflected on the surface of the video disc (4) is focused again by the objective lens (3) and the ray is reversely passed through the path to return the emitting part (15) having the pn junction of the semiconductor ray source (14). The output of the semiconductor ray source (14) is varied by the incident ray. Thus, the variation of the output is detected by the ray detector (8) disposed at the rear part of the semiconductor ray source (14) and the signal is processed by the signal processing circuit (16) to carry out a video regeneration.

Thus, the oscillator (11) excites the vibrator (9) as driving means whereby the semiconductor ray source (14) is vibrated to optical axial direction at constant frequency f.

When the ray emitting part (15) is placed at the position for focusing on the surface of the video disc (4), the ray reflected from the surface of the video disc (4) is substantially passed to the emitting part (15). However, when the surface of the video disc (4) is deviated from the focal point of the objective lens (3), a size of the reflected image focused on the emitting part (15) is increased to over-spread from the emitting part (15) whereby the effective incident ray is reduced. Thus, when the semiconductor ray source (14) is vibrated to the optical axial direction, the effect being similar to the vibrating pin-hole of the conventional apparatus can be expected in this apparatus.

That is, the output of the ray detector (8) has the component of frequency 2f when the surface of the video disc (4) is at the focal point of the objective lens (3) whereas it has the component of frequency f when the surface of the video disc (4) is deviated from the focal point. The phase of the frequency f is reversed depending upon the direction deviating from the focal point.

The output of the ray detector (8) is phase-detected by the phase detector (12) under the rating of the output of the oscillator (11). The object lens (3) is shifted to the arrow line direction A by the detection output through the actuator (13) whereby the focal point can be automatically focused on the surface of the video disc (4).

In the embodiment, the rear radiation to the semiconductor ray source is detected. Thus, the forward radiation to the semiconductor ray source can be detected by using a beam splitter.

Figure 3:
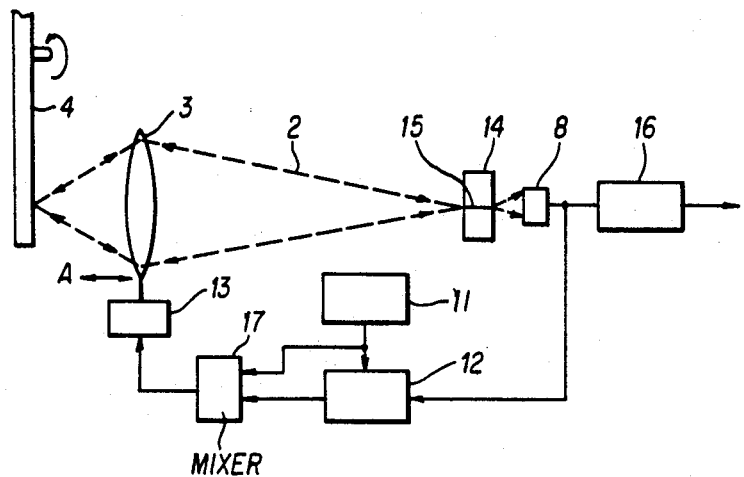
FIGS. 3, 4 and 5 are respectively diagrams showing structures of the other embodiments of the present invention.

Another embodiment of the present invention is shown in FIG. 3 wherein the reference (17) designates a mixer circuit for mixing the output of the oscillator (11) with the output of the phase detector (12).

The feature of the embodiment is to oscillate the objective lens (3) to the optical axial direction at a constant frequency f through the actuator (13) by the output of the oscillator (11).

That is, when the objective lens (3) is vibrated through the actuator (13) by the output of the oscillator (11) having the frequency f, the effect being similar to that of the vibrating pin-hole of the conventional apparatus can be expected. The output of the ray detector (8) has the component of frequency 2f when the surface of the video disc (4) is at the focal point of the objective lens (3). Thus, when the surface is deviated from the focal point, the output of the ray detector (8) has the component of frequency f whereby the phase of the component of the frequency f is inverted depending upon the direction deviating from the focal point. The output of the ray detector is phase-detected by the phase detector (12) under rating the output of the oscillator (11) and the detection output is mixed by the mixer circuit (17) and the mixed signal is applied to the actuator (13) whereby the average position of the objective lens (3) is controlled to the arrow line direction A and the focal point can be automatically adjusted on the surface of the video disc (4).

In the embodiments shown in FIGS. 2 and 3, the ray detector is used by utilizing the variation of the output of the semiconductor ray source caused by the incident ray to the semiconductor ray source. However, the terminal voltage of the semiconductor ray source is varied by the incident ray and accordingly, the terminal voltage variation output can be utilized.

Figure 4:
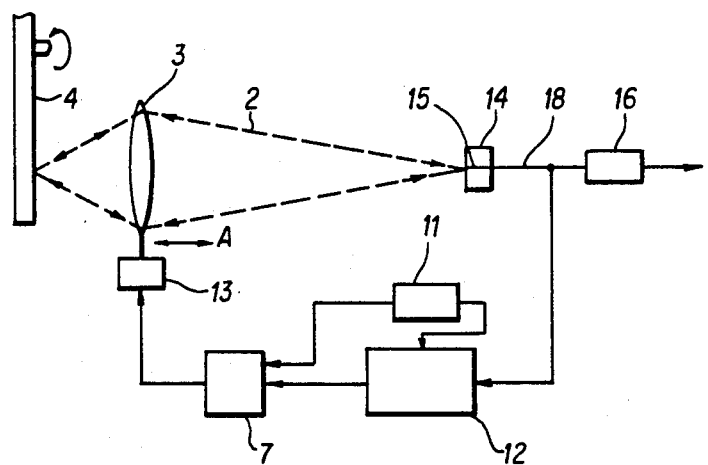

FIG. 4 shows yet another embodiment utilizing the terminal voltage variation output of the semiconductor ray source.

The ray (4) emitted from the semiconductor ray source (14) such as semiconductor laser and light emission diode is focused by the objective lens (3) on the surface of the video disc (4) on which signal such as video signal is optically recorded. The focusing ray (2) is reflected on the surface of the disc whereby the reflected ray is focused by the objective lens (3) and it is reversely passed through the path to the emitting part (pn junction) of the semiconductor ray source (14). The terminal voltage of the semiconductor ray source (14) is varied by the incident ray and accordingly, the terminal voltage variation output (18) is applied to the phase detector (12) to carry out the phase detection by using the output of the oscillator (11) for driving the actuator (13) which vibrates the objective lens (3) to the optical axial direction at a constant frequency f as the reference signal.

The output of the phase detector (12) is superposed to the output of the oscillator (11) by the mixer circuit (17) and then, the output is applied to the actuator (13) which controls the position of the objective lens (3) in the optical axial direction.

When the ray varied by the position of the surface of the disc and the vibration of the objective lens (3) to the optical axial direction is passed to the emitting part, the terminal voltage of the semiconductor ray source (11) is varied. For example, a resistor is connected to a circuit of the semiconductor ray source and the voltage applied between the terminals is measured to detect the terminal voltage of the semiconductor ray source whereby the signal having the frequency 2f at the focusing position and the signal having the frequency f and the phase shift of $\pi$ near the focusing position are given. Accordingly, the phase detection of the signals is carried out by the phase detector (12) to obtain the signal proportional to the shift of the video disc. The polarity of the signal is adjusted and the signal is applied to the actuator to control the position of the objective lens (3) in the optical axial direction whereby the focal point of the objective lens (3) can be always adjusted to the surface of the disc.

Figure 5:
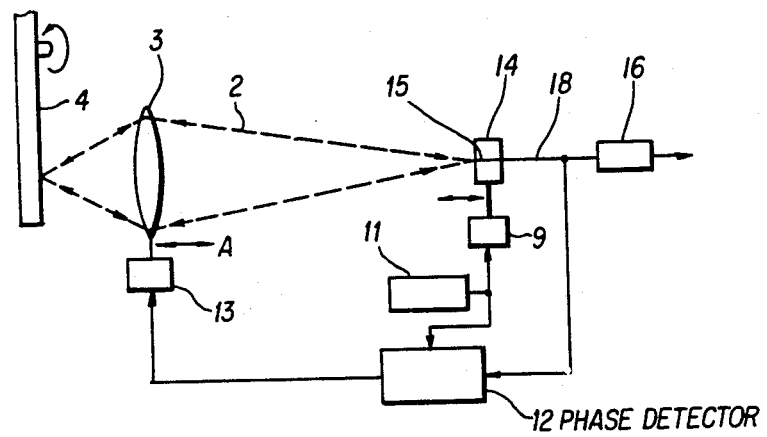

FIG. 5 shows another embodiment of the present invention and the feature of the embodiment is to vibrate the semiconductor ray source (14) at a constant frequency f to the optical axial direction and to pass the terminal voltage variation output of the semiconductor ray source (14) caused by the incident ray to the phase detector (14) and to carry out the phase detection of the output of the oscillator (11) as a reference signal whereby the actuator (13) is driven depending upon the detection output to control the position of the objective lens (13) in the optical axial direction.

In accordance with the embodiment, the focal point can be always formed on the surface of the video disc as the other embodiments.

We claim:

1. An automatic focusing apparatus which comprises a semiconductor ray source; focusing means for focusing a ray of said semiconductor ray source on an object substrate and focusing the reflective ray to an emitting part of said semiconductor ray source; driving means for vibrating, at a predetermined frequency, a position of a ray spot formed by focusing by said focusing means in optical axial direction; an oscillator for exciting said driving means at a predetermined frequency; a phase detector which detects a variation of output characteristics of said semiconductor ray source induced by the reflective ray reflected by said object substrate to carry out phase detection under using the output of said oscillator as the reference signal; and an actuator which controls said focusing means depending upon the output of said phase detector to coincide the focal point of said ray spot with the surface of said object substrate.

2. An automatic focusing apparatus according to claim 1 wherein said semiconductor ray source is vibrated at a predetermined frequency to the optical axial direction to vary the position of said ray spot to the optical axial direction.

3. An automatic focusing apparatus according to claim 1 wherein said focusing means is vibrated at a predetermined frequency to the optical axial direction to vary the position of said ray spot to the optical axial direction.

4. An automatic focusing apparatus according to one of claims 1 to 3 wherein a variation of output of said semiconductor ray source induced by the reflective ray reflected by said object substrate is detected to carry out a phase detection.

5. An automatic focusing apparatus according to one of claims 1 to 3 wherein a variation of terminal voltage of said semiconductor ray source induced by the reflective ray reflected by said object substrate is detected to carry out a phase detection.

* * * * *